US012315485B2

(12) United States Patent
Griffin

(10) Patent No.: US 12,315,485 B2
(45) Date of Patent: May 27, 2025

(54) METAMATERIAL DESIGN WITH PERFORATED NOZZLES FOR ACOUSTIC NOISE REDUCTION

(71) Applicant: United States of America as Represented by the Secretary of the Army, Washington, DC (US)

(72) Inventor: Brittany Consuegra Griffin, Huntsville, AL (US)

(73) Assignee: United States of America as Represented by The Secretary of the Army, Washington, DC (US)

( * ) Notice: Subject to any disclaimer, the term of this patent is extended or adjusted under 35 U.S.C. 154(b) by 384 days.

(21) Appl. No.: 17/859,934

(22) Filed: Jul. 7, 2022

(65) Prior Publication Data

US 2023/0010032 A1 Jan. 12, 2023

Related U.S. Application Data

(60) Provisional application No. 63/220,541, filed on Jul. 11, 2021.

(51) Int. Cl.

| | |
|---|---|
| ***G10K 11/162*** | (2006.01) |
| ***G10K 11/04*** | (2006.01) |
| *G10K 11/172* | (2006.01) |

(52) U.S. Cl.
CPC ............ *G10K 11/162* (2013.01); *G10K 11/04* (2013.01); *G10K 11/172* (2013.01)

(58) Field of Classification Search
CPC ..... G10K 11/162; G10K 11/04; G10K 11/172
USPC ............... 181/288, 294, 176, 290, 223, 292; 428/116, 118, 131, 593; 123/184.57; 29/889.22, 896.2
See application file for complete search history.

(56) References Cited

U.S. PATENT DOCUMENTS 11,835,315 B2 * 12/2023 Lo ........................... F41A 21/30
2016/0071507 A1 * 3/2016 Kim .......................... E04B 1/84
181/286

FOREIGN PATENT DOCUMENTS

CN 106205590 A * 12/2016 ............... E04B 1/84
JP H-08183122 * 7/1996
WO WO-2021194419 A1 * 9/2021

OTHER PUBLICATIONS

Machine Translation of CN-106205590-A (Year: 2016).*
Machine translation of JPH08183122 (Year: 1996).*

(Continued)

*Primary Examiner* — Dedei K Hammond
*Assistant Examiner* — Jennifer B. Olson
(74) *Attorney, Agent, or Firm* — Michael K. Gray

(57) ABSTRACT

An acoustic-metamaterial acts as a sound reducing filter in that the level of sound that exits the structure is much less than the magnitude of sound that enters the structure. In forming the structure, modular stages of a given geometry are stacked upon one another to create a cell. Each stage of the cell is provided with a nozzle that is acoustically connected to the nozzles of other stages of the cell. The stages have chambers that are positioned radially or laterally outside of the respective nozzles, with the chambers of the cell being acoustically connected to one another. An amalgamation of cells are arranged in an adjacent formation, with chambers of the cells being acoustically connected to one another for purposes of protecting items, components and people from destructive levels of sound.

14 Claims, 9 Drawing Sheets

(56) References Cited

OTHER PUBLICATIONS

S. Beeby, G. Ensell, M. Kraft and N. White, MEMS Mechanical Sensors, Norwood, MA: Artech House, Inc, 2004.
S. Khazaaleh, G. Korres, M. Eid, M. Rasras and M. F. Daqaq, "Vulnerability of MEMS Gyroscopes to Targeted Acoustic Attacks," IEEE Access, vol. 7, 2019.
T. Trippel, O. Weisse, W. Xu, P. Honeyman and K. Fu, "WALNUT: Waging Doubt on the Integrity of MEMS Accelerometers with Acoustic Injection Attacks," IEEE European Symposium on Security and Privacy, 2017.
Y. Son, H. Shin, D. Kim, Y. Park, J. Noh, K. Choi, J. Choi and Y. Kim, "Rocking Drones with Intentional Sound Noise on Gyroscopic Sensors," USENIX Security Symposium, vol. 24, 2015.
A. Boardman, "Pioneers in metamaterials: John Pendry and Victor Veselago," Journal of Optics, vol. 13, No. 2, 2011.
G. Ma and P. Sheng, "Acoustic metamaterials: From local resonances to broad horizons," American Association for the Advancement of Science, 2016.
K. J. M. Bishop, "Acoustic Metamaterials, Living Bandgaps," Nature Materials, vol. 16, pp. 786-787, 2017.
F. Zhang, G. Flowers, E. Perkins, R. Dean, D. Marghitu and J. Hung, "Metalenses, Acoustic Metamaterials: Air Permeable Super Sound Attenuators and Acoustic," Auburn University, Auburn Al, 2019.
Y. Tang, S. Ren, H. Meng, F. Xin, L. Huang, T. Chen, C. Zhang and T. J. Lu, "Hybrid acoustic metamaterial as super absorber for broadband low-frequency sound," Nature Scientific Reports, 2017.
C. Casarini, J. F. Windmill and J. C. Jackson, "3D printed small-scale acoustic metamaterials based on Helmholtz resonators with tuned overtones," in IEEE Sensors, Glasgow, Scotland, 2017.
R. Ghaffarivardavagh, J. Nikolajczyk, S. Anderson and X. Zhang, "Ultra-open acoustic metamaterial silencer based on Fano-like interference," *Physical Review*, vol. B 99, No. 024302, 2019.
G. L. Huang and C. T. Sun, "Band Gaps in a Multiresonator Acoustic Metamaterial," *Journal of Vibration and Acoustics*, vol. 132, 2010.
M. Chen, D. Meng, H. Jiang and Y. Wang, "Investigation on the Band Gap and Negative Properties of Concentric Ring Acoustic Metamaterial," *Hindawi Shock and Vibration*, p. 12, 2018.
MSC Software Company, "Damping in acoustic simulation," MSC Software Company, Detroit, MI, 2018.
C. Sambuc, G. Lielens and J.-P. Coyette, "Numerical modelling of visco-thermal acoustics using finite elements," in *International Conference on Noise and Vibration Engineering*, Mont-Saint-Guibert, Belgium, 2014.

* cited by examiner

METAMATERIAL DESIGN WITH PERFORATED NOZZLES FOR ACOUSTIC NOISE REDUCTION

Priority is claimed to Provisional Application No. 63/220,541 filed on Jul. 11, 2021 which is hereby incorporated by reference.

GOVERNMENT RIGHTS

All rights in the invention have been assigned to the U.S. Government.

BACKGROUND OF THE INVENTION

1. Field of Invention

The present invention pertains to acoustic metamaterial structures. More particularly, the present invention pertains to an acoustic metamaterial structure having a nozzle having axial and radially oriented passageways extending into various chambers. Stages of acoustic metamaterial structures are stacked upon one another to form cells such that sound waves are diminished in amplitude as they pass in and then out of the cells.

2. Discussion of the Background

A common environment found in aerospace, military, industrial and commercial applications is that of high frequency, high amplitude acoustic noise. Such high noise environments can prove hazardous to equipment and personnel.

SUMMARY OF THE INVENTION

The present invention includes a cell that has stages. A first main stage has a nozzle that extends through the top of the first main stage and extends through the bottom of the first main stage. The top and bottom opening of the nozzle create an axial path for sound waves to travel. In addition, the wall or walls that form the nozzle of the first main stage are provided with passages that lead to first-main stage chambers located radially outward or laterally outward from the walls of the nozzle of the first main stage.

A second main stage (intermediate main stage) has a nozzle that extends through the top of the intermediate main stage and extends through the bottom of the intermediate main stage, with the nozzle of the intermediate main stage being acoustically connected to the nozzle of the first main stage. The top and bottom opening of the second-main stage nozzle create an axial path for sound waves to travel. In addition, the wall or walls that form the nozzle of the intermediate main stage are provided with passages that lead to intermediate main stage chambers located radially outward or laterally outward from the walls of the nozzle of the intermediate main stage. The top surface of the intermediate main stage has passages which connect to passages located in the bottom surface of the first main stage so as to connect the chambers of the first main stage with the chambers of the intermediate main stage. The bottom surface of the intermediate main stage has passages which connect to passages located in the top surface of the final main stage so as to connect the chambers of the intermediate main stage with the chambers of the final main stage.

A final main stage has a nozzle that extends through the top of the final main stage and extends through the bottom of the final main stage, with the nozzle of the final main stage being acoustically connected to the nozzle of the intermediate main stage. The top and bottom openings of the final main stage nozzle create an axial path for sound waves to travel. In addition, the wall or walls that form the nozzle of the final main stage are provided with passages that lead to final main stage chambers located radially outward or laterally outward from the walls of the nozzle of the final main stage. The top surface of the final main stage has passages which connect to passages located in the bottom surface of the intermediate main stage so as to connect the chambers of the intermediate main stage with the chambers of the final main stage.

An optional initial stage has a nozzle that extends from the top of the initial stage through the bottom of the initial stage. The initial stage has chambers that are located radially or laterally outward form the nozzle; however, the nozzle of the initial stage is not provided with lateral or radial passages for connecting the nozzle of the initial stage to the chambers located in the initial stage.

The chambers of the initial stage are connected to the chambers of the first main stage by passages located in the bottom surface of the initial stage which connect to passages located in the top surface of the first main stage which connect the chambers of the initial stage to the chambers of the first main stage.

The respective stages of a cell are of a given geometry so as to be able to be effectively stacked upon and securely connected to one another in a modular manner. Multiple cells of the present invention can be connected to adjacent cells. Holes in the sidewalls of the respective stages of a cell connect to holes in adjacent sidewalls of an adjacent cell such that the adjacent chambers of adjacent cells are connected to one another. The construction of adjacent cells can be formed into a structure that protects a desired object from damaging sound wave levels. The number of stages for the cell structures will be dependent upon the degree of sound-level filtering needed for a given situation.

DESCRIPTION OF THE DRAWINGS

A more complete appreciation of the invention and many of the attendant advantages thereof will be readily obtained by reference to the following detailed description when considered in connection with the accompanying drawings.

DETAILED DESCRIPTION

Figure 1:
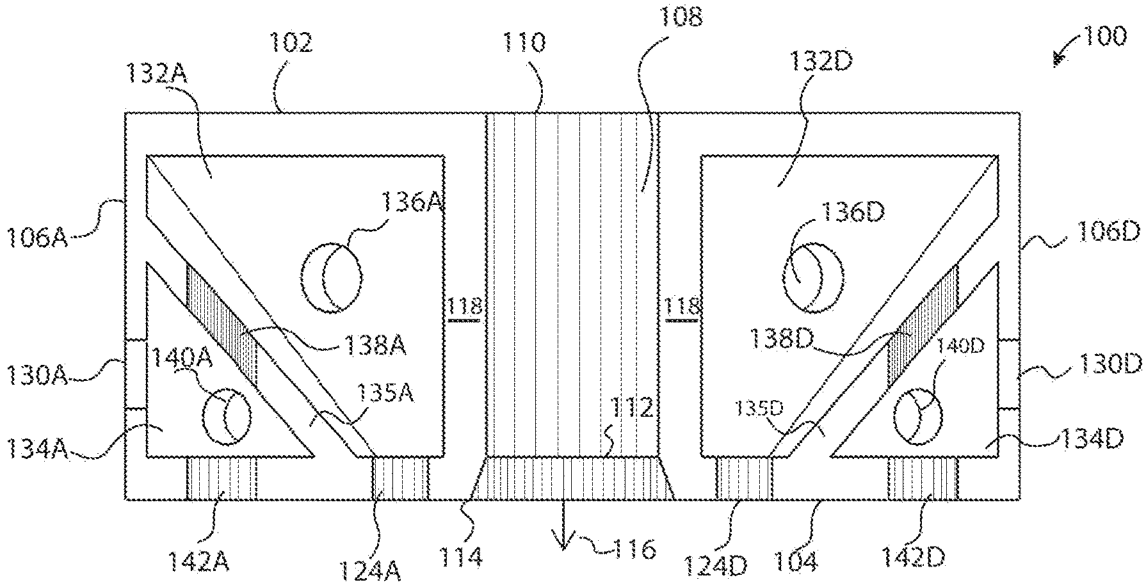
FIG. 1 is a side, cross-sectional view of an optional initial stage 100 in accordance with the present invention taken along line AA of FIG. 3.

With reference to FIG. 1, initial Stage 100 has a top surface 102 and a bottom surface 104. Top surface 102 and bottom surface 104 connect to sidewalls 106A and 106D. A nozzle 108 has an entrance opening 110, with nozzle 108 being defined by surrounding wall 118, with surrounding wall 118 connecting to the top surface 102 and to bottom surface 104 of nozzle 108. The nozzle 108 is cylindrical in shape, with wall 118 tapering outward between cylindrical rings 112 and 114. Ring 114 at the bottom surface 104 defines an outlet 116 for the exit of sound waves from the initial stage 100.

Still with reference to FIG. 1, inner chamber wall 132A and inner chamber wall 132D are respectively provided with inner chamber passages or holes 136A, 136D which acoustically connect the respective inner chambers 120A, 120D (FIG. 2) with other inner chambers (not shown) of the initial stage 100. Respective outer chamber walls 134A, 134D serve to separate respective outer chambers 126A, 126D (FIG. 2) from other outer chambers (not shown) that lie within initial stage 100.

Connecting passage or hole 140A in outer chamber wall 134A, and connecting passage or hole 140D in outer chamber 1324D respectively connect the outer chamber 126A and 126D to other outer chambers within the initial stage 100. A separating wall 135A separates inner chamber 120A from outer chamber 126A. Inner chamber 120A and outer chamber 126A are acoustically connected by hole or passage 138A which extends through separating wall 135A. Inner chamber 120D and outer chamber 126D are acoustically connected by hole or passage 138D which extends through separating wall 135D.

A separating wall 135D separates inner chamber 120D from outer chamber 126D. Inner chamber 120D and outer chamber 126D are acoustically connected by hole or passage 138D which extends through separating wall 135D. The respective separating walls (e.g. walls 135A, 135D) form an oblique angle (i.e., less than 90 degrees) with the floors (floors 122A, 122D) of the respective inner chambers.

An outer chamber passage or hole 142A (FIG. 1) extends through the bottom 104 of initial stage 100 for purposes of connecting outer chamber 126A with a chamber in a subsequent stage to which the initial stage 100 is stacked upon. Outer chamber passage or hole 142D extends through the bottom 104 of initial stage 100 for purposes of connecting outer chamber 126D with a chamber in a subsequent stage to which the initial stage 100 is stacked upon.

An inner chamber passage or hole 124A at the floor 122A of the inner chamber 126A extends through the bottom 104 of initial stage 100 for purposes of connecting inner chamber 120A with a chamber in a subsequent stage to which initial stage 100 is stacked upon. Inner chamber passage or hole 124D at the floor 122D of inner chamber 120D extends through the bottom 104 of initial stage 100 for purposes of connecting inner chamber 120D with a chamber in a subsequent stage to which initial stage 100 is stacked upon.

Figure 2:
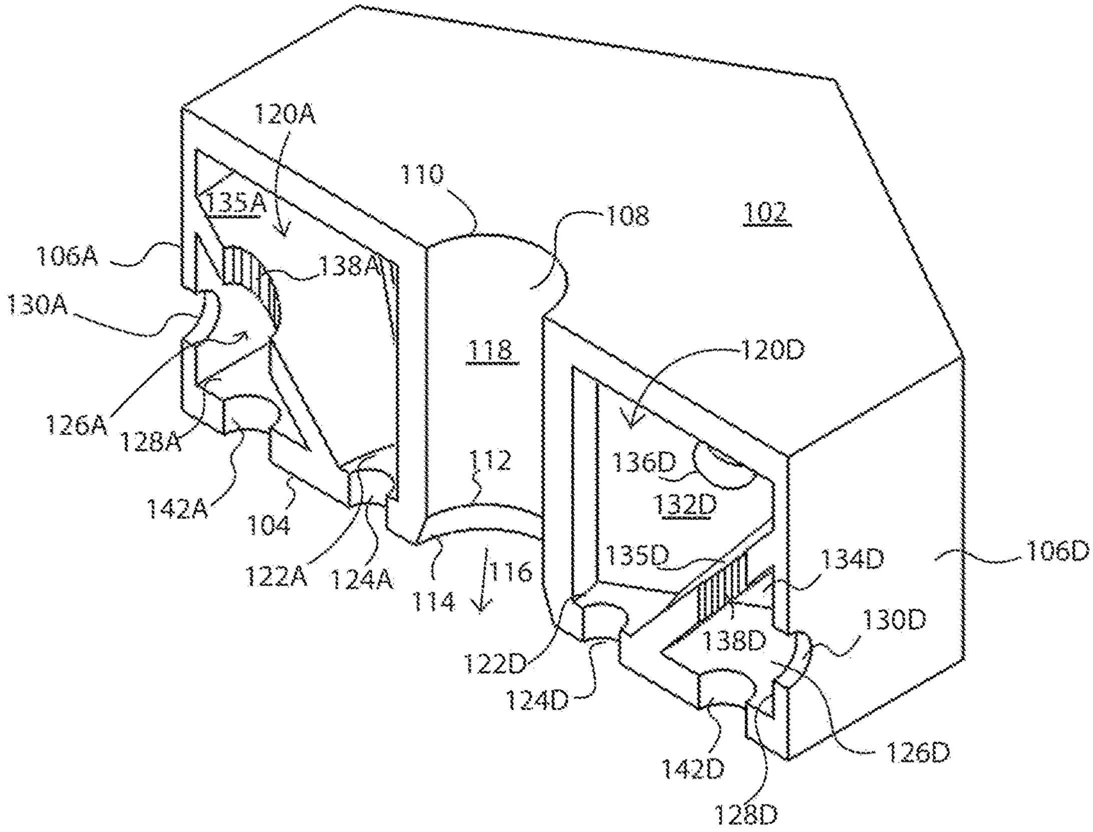
FIG. 2 is a perspective cross-sectional view of the optional initial stage 100.

FIG. 2 is a perspective cross-sectional view that provides additional clarity for the features discussed in respect to FIG. 1. From the top 102 of the initial stage 100, it can be appreciated that initial stage 100 has a hexagonal shape, with the cylindrical form of the nozzle 108 being fully appreciated. Separating wall 135A is connected to sidewall 106A and slopes at an angle to connect with the bottom 104 of the initial stage 100 at a location which is located radially outward from hole 124A. Separating wall 135D is connected to sidewall 106D and slopes at an angle to connect to the bottom 104 of the initial stage 100 at a location located radially outward from hole 124D. Outer chambers 126A, 126D have respective outer floors 128A, 128D.

Inner chamber 120A is acoustically connected to outer chamber 126A through hole 138A which is formed in separating wall 135A, and inner chamber 120D is acoustically connected to outer chamber 126D through hole 138D which is formed in separating wall 135D. Inner chamber 120A acoustically connects to a chamber in a subsequent stage through hole 124A, and inner chamber 120D acoustically connects to a chamber in a subsequent stage through hole 124D.

The cylindrical rings 112 and 114 that define the tapered section of the nozzle 108 allow for easy connection to a nozzle section of a subsequent stage upon which the initial stage 100 is stacked. Hole 130A connects outer chamber 126A to an adjacent chamber of an adjacent stage of an adjacent cell and, in a like manner, hole 130D is for purposes of connecting outer chamber 126D to an adjacent chamber of an adjacent stage of an adjacent cell. Hole 142A in the bottom of initial stage 100 connects outer stage 126A to a chamber in a subsequent stage to which initial stage 100 is stacked upon, and hole 142D in the bottom of initial stage 100 connects outer stage 126D to a chamber in a subsequent stage to which initial stage 100 is stacked upon.

Figure 3:
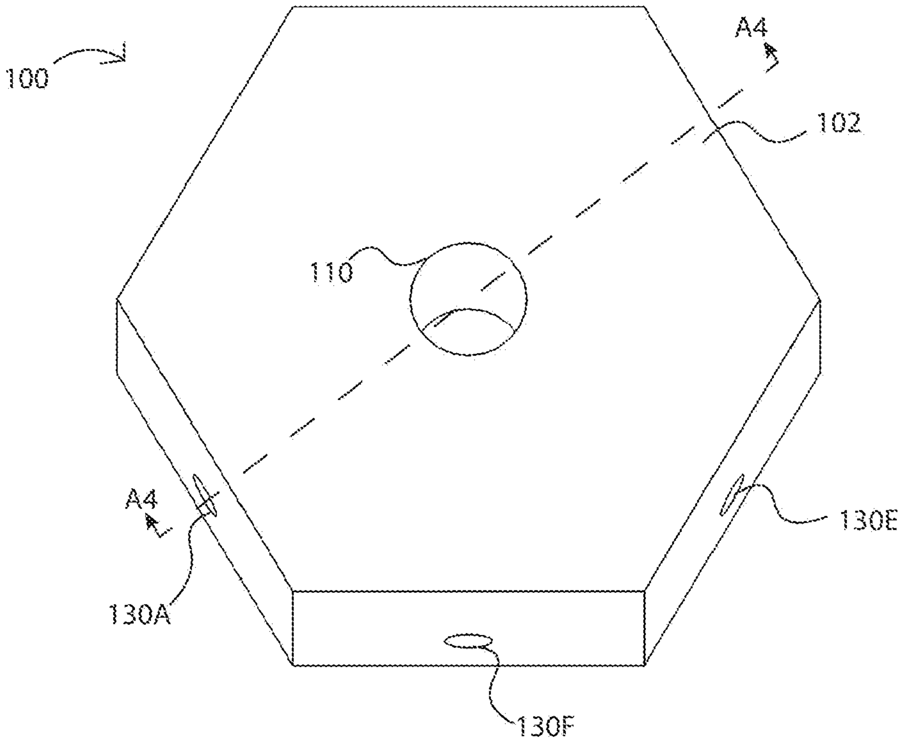
FIG. 3 is a top perspective view of the optional initial stage 100.

The hexagonal shape of the initial stage 100 is further appreciated in the top perspective view of FIG. 3 and fully visualizes the top edge or ring 110 of the nozzle 108 on top surface 102. Outer chamber connecting holes 130A, 130E and 130F are positioned in the respective sidewalls and allow sound waves to exit the respective outer chambers and enter the respective outer chambers of an adjacent stage of an adjacent cell.

Figure 4:
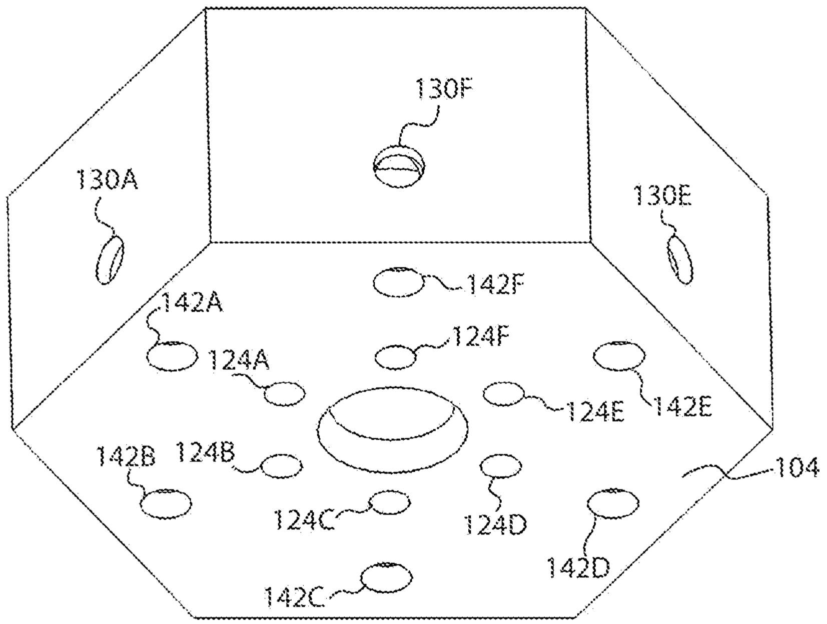
FIG. 4 is a bottom perspective view of the optional initial stage 100.

The bottom perspective view of FIG. 4 shows outer chamber connecting holes or passages 142A, 142B, 142C, 142D, 142E, 142F that connect respective outer chambers in the initial stage 100 to respective chambers in a subsequent main stage to which the initial stage is stacked upon. Inner chamber connecting holes or passages 124A, 124B, 124C, 124D, 124E, 124F connect respective inner chambers in the initial stage 100 to respective chambers in a subsequent main stage to which the initial stage is stacked upon.

Figure 5:
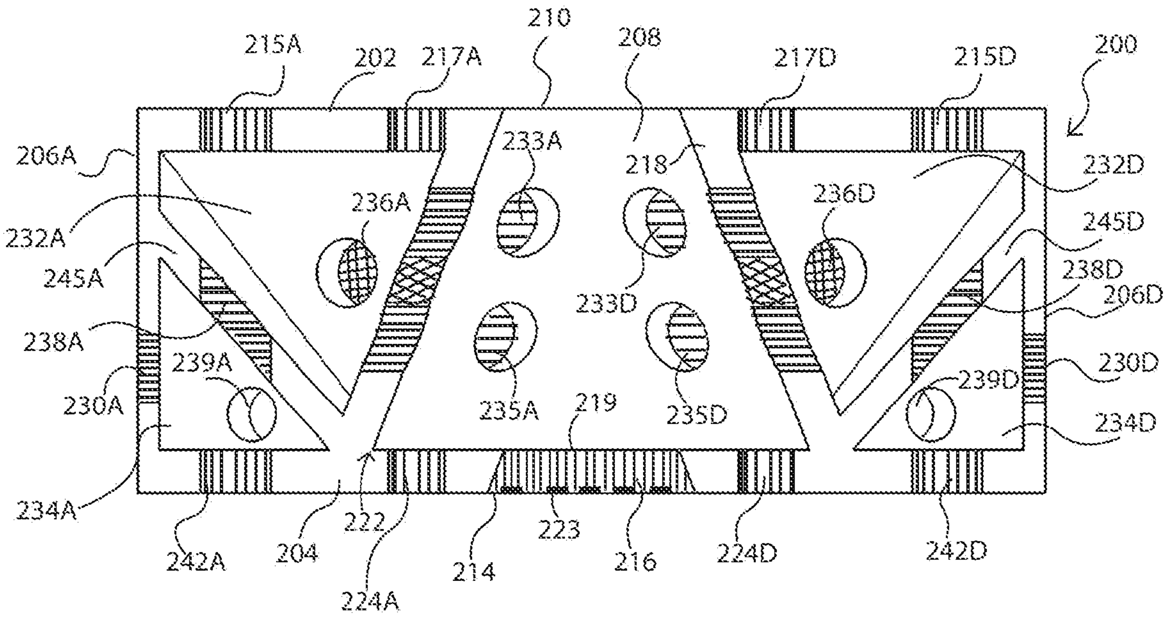
FIG. 5 is a side, cross-sectional view of first main stage 200, in accordance with the present invention, taken along line BB of FIG. 7.
Figure 6:
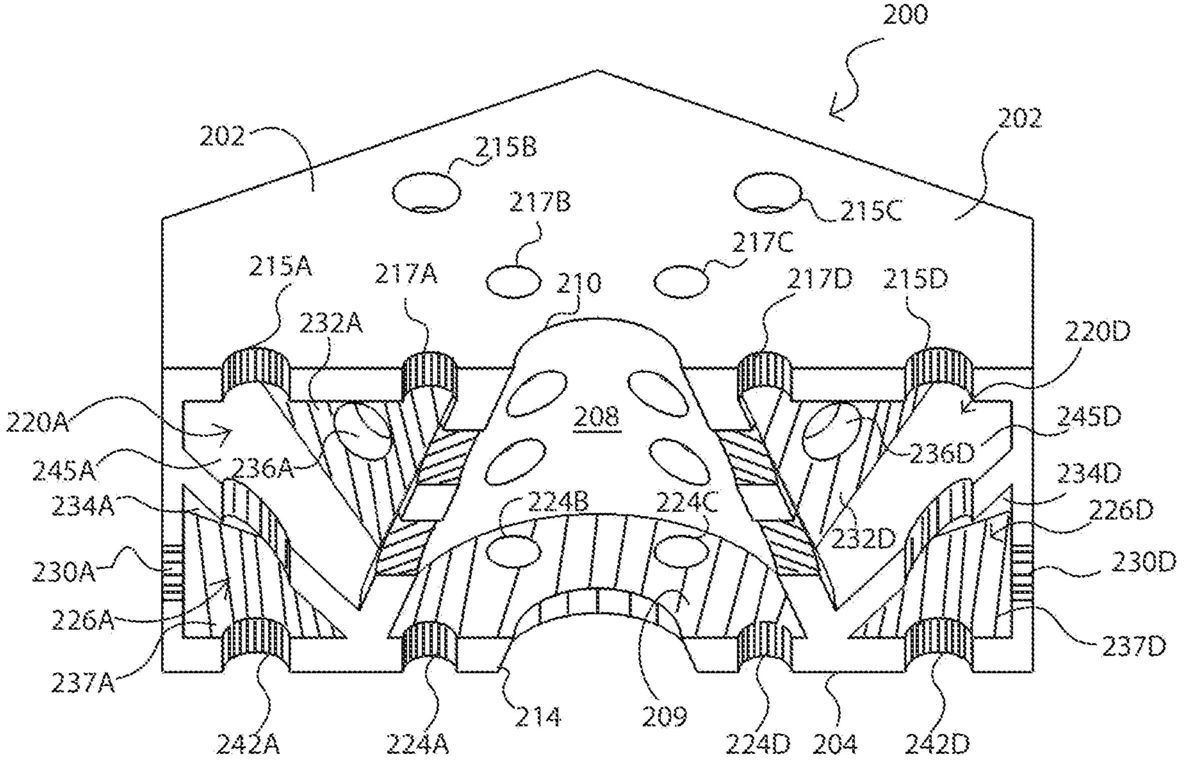
FIG. 6 is a perspective cross-sectional view of first main stage 200.
Figure 7:
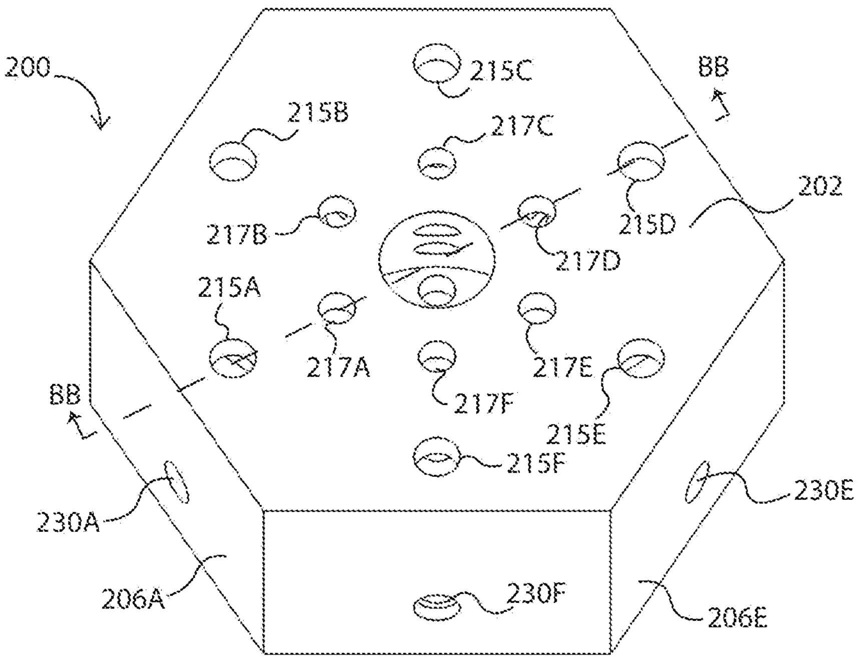
FIG. 7 is a top perspective view of the first main stage 200.

Attention is now directed to FIG. 5 which is a cross-sectional view of first main stage 200 taken along line BB of FIG. 7 and to FIG. 6 which is a perspective view of the cross-sectional view of FIG. 5. First main stage 200 has a top surface 202 and a bottom surface 204. Sidewalls 206A and 206D connect to top surface 202 and bottom surface 204.

Top surface 202 is provided with holes or passages 215A, 215D that acoustically connect to holes 142A, 142D, respectively, of the initial stage 100 (FIG. 1). Holes 215A and 215D acoustically connect to inner chambers 220A and 220D, respectively. In a like manner, holes 217A and 217D, which are located radially inward from holes 215A and 215D, respectively connect to holes 124A and 124D of the initial stage 100, with holes 215A and 215D connecting to inner chambers 220A and 220D (FIG. 6), respectively.

A conically-shaped nozzle 208 is formed by a conical wall 218. Conical wall 218 forms an entrance opening 210 at the top surface 202 of the first main stage 200. Conical wall 218 connects to bottom surface 204 of first main stage 200. Located radially within the bottom outer radius 222 of conical wall 218 are holes 224A, 224B, 224C, 224D which acoustically connect soundwaves from the nozzle 208 to respective holes or passages in a second main stage (intermediate main stage) 300.

Holes 224A, 224B, 224C, 224D are positioned within a peripheral bottom region 223 of nozzle 208, with peripheral bottom region 223 being formed between outer bottom ring 222 and inner bottom ring 226 which forms outlet hole 216. Outlet hole 216 is tapered in that lower bottom ring 214 is of a greater radial distance from the axial center of outlet hole 216 than the radial distance of upper-bottom ring 219 so as to allow for a secure connection with a like-shaped intermediate main stage.

Inner chamber dividing walls 232A, 232D respectively separate inner chambers 220A, 220D from adjacent inner chambers of the first main stage 200, with the respective holes 236A, 236D acoustically connecting adjacent inner chambers (not shown). Separating walls 245A, 245D respectively separate inner chamber 220A from outer chamber 236A and inner chamber 220D from outer chamber 236D.

Figure 9:
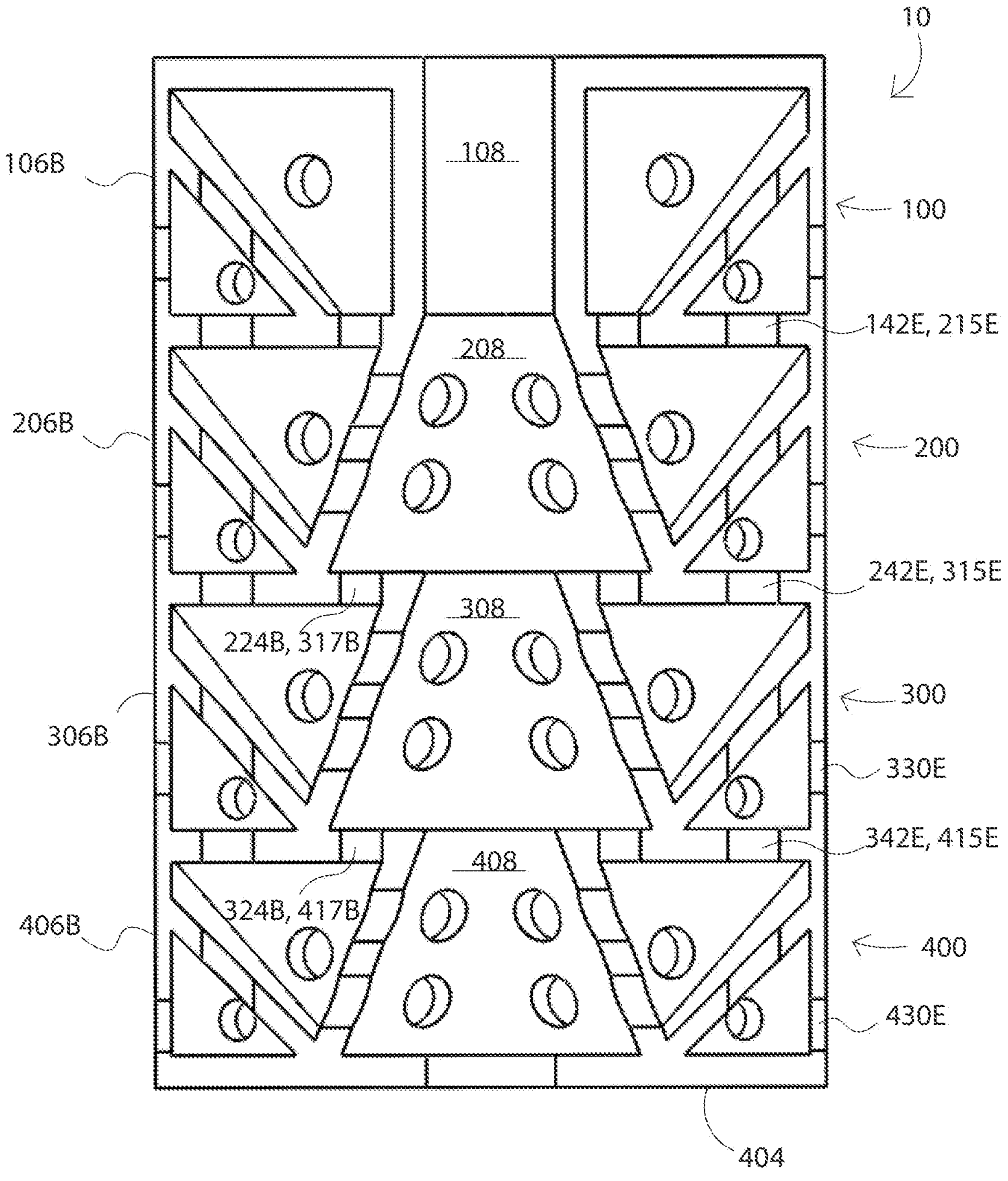
FIG. 9 is a cross-sectional view of cell 10, in accordance with the present invention, taken along line CC of FIG. 11, with cell 10 consisting of optional initial stage 100, first main stage 200, second main stage (intermediate main stage) 300, and final main stage 400.

Holes 238A, 238D acoustically connect inner chamber 220A with outer chamber 226A and to inner chamber 220D and outer chamber, respectively. The floor 237A of the outer chamber 226A has a hole or passage 242A that connects to a passage in an intermediate main stage 300. In a like manner, the floor 237D of the outer chamber 226D has a hole or passage 242D that connects to a passage in the intermediate main stage 300 (FIG. 9).

Still with reference to FIGS. 5 and 6, holes 236A and 236D are located in inner chamber dividing walls 232A and 232D, respectively, so as to connect respective inner chambers 220A, 220D with adjacent inner chambers in main stage 200. Holes or passages 233A, 233D connect respective inner chambers 220A, 220D with the upper region of conical nozzle 208 and holes or passages 235A, 235D connect the respective inner chambers 220A, 220D with the lower region of conical nozzle 208. Separating walls 245A, 245D, respectively separate inner chamber 220A from outer chamber 226A and inner chamber 220D from outer chamber 226D.

In forming inner chamber 220A, and lower chamber 226A, separating wall 245A connects to sidewall 206A and slopes at an angle before connecting to conical wall 218.

In a like manner, in forming inner chamber 220D, and lower chamber 226D, separating wall 245D connects to sidewall 206D and slopes at an angle before connecting to conical wall 218. Sidewall 206A has a hole 230A for purposes of connecting the outer chamber 226A to a an adjacent chamber in an adjacent cell and sidewall 206D has a hole 230D for purposes of connecting the outer chamber 226D to a corresponding adjacent chamber in an adjacent cell.

In FIG. 7, the top perspective view of first main stage 200 clearly visualizes top surface 202. Top surface 202 has holes or passages 215A, 215B, 215C, 215D, 215E, 215F for purposes of connecting to holes or passages 142A, 142B, 142C, 142D, 142E, 142F of the initial stage 100, so as to acoustically connect the respective outer chambers of the initial stage to the respective inner chambers of the first main stage. In addition, top surface 202 has passages 217A, 217B, 217C, 217D, 217E, 217F that are located radially inward from passages 215A, 215B, 215C, 215D, 215E, 215F.

Passages 217A, 217B, 217C, 217D, 217E, 217F are for purposes of connecting to holes or passages 124A, 124B, 124C, 124D, 124E, 124F located at the bottom of the initial stage 100 so as to acoustically connect the outer chambers of the initial stage to respective inner chambers of the first main stage. FIG. 7 further demonstrates exit holes 230A, 230E, 230F located in the respective sidewalls 206A, 206E, 206F.

Figure 8:
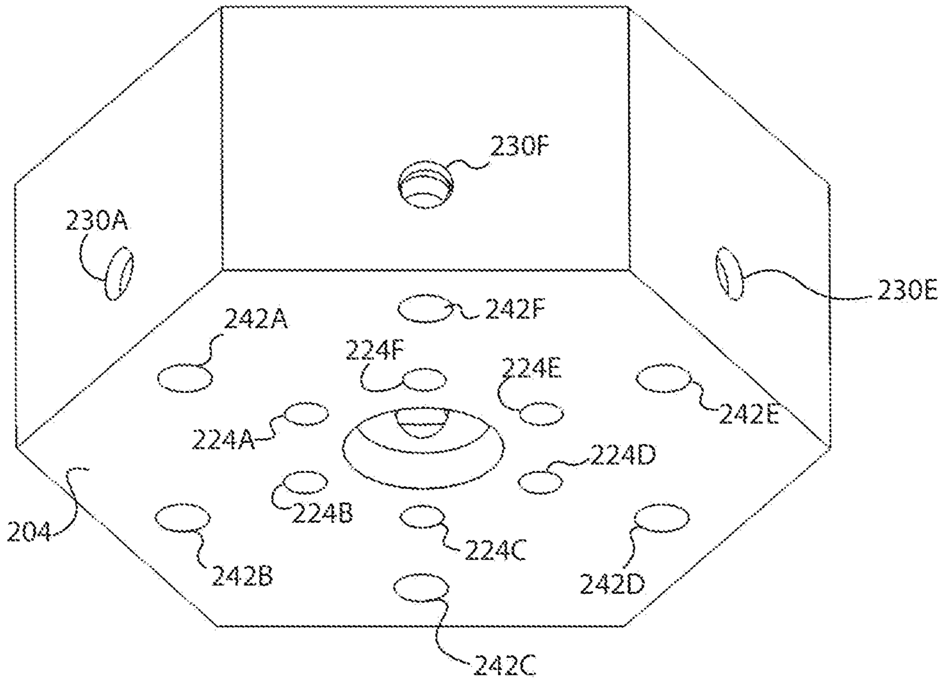
FIG. 8 is a bottom perspective view of the first main stage 200.

In the perspective bottom view of FIG. 8, the bottom surface 204 of the first main stage 200 can be clearly appreciated. The bottom surface 204 has 242A, 242B, 242C, 242D, 242E, 242F for purposes of connecting to corresponding holes 315A, etc., (FIG. 9), in the intermediate main stage so as to connect the outer chambers 226A, 226D, etc., to the inner chambers 320A, 320D, etc., of the intermediate main stage (FIG. 9).

Holes 224A, 224B, 224C, 224D, 224E, 224F which are located at the bottom surface 204 of first main stage 200 connect the nozzle 208 to respective holes (e.g., hole 317A, 317E, etc.,) of the intermediate main stage. This results in the nozzle 208 of the first main stage 200 being acoustically connected to the respective inner chambers of the intermediate main stage.

Figure 11:
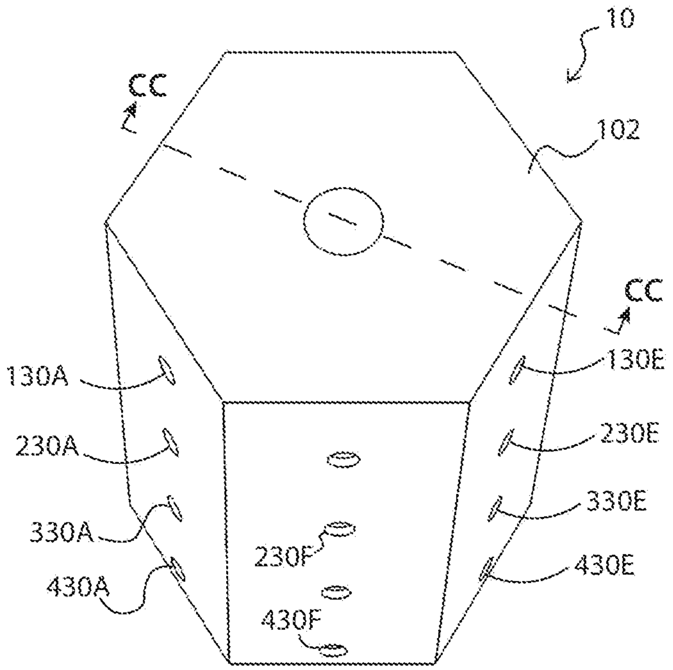
FIG. 11 is a top, perspective view of cell 10.

FIG. 9 is a cross-sectional view of cell 10 that is taken along line CC of FIG. 11. Initial stage 100 is stacked upon first main stage 200 which is stacked upon intermediate main stage 300 which is stacked upon final main stage 400 to form cell 10. Final stage 400 has a bottom surface 404, with the bottom edge 414 of nozzle 408 forming the sole acoustic bottom exit from bottom surface 404 of final stage 400. The geometries of the nozzles of the initial stage, first main stage, intermediate main stage, and final stage allow for a secure and snug modular connection between stages.

Figure 10:
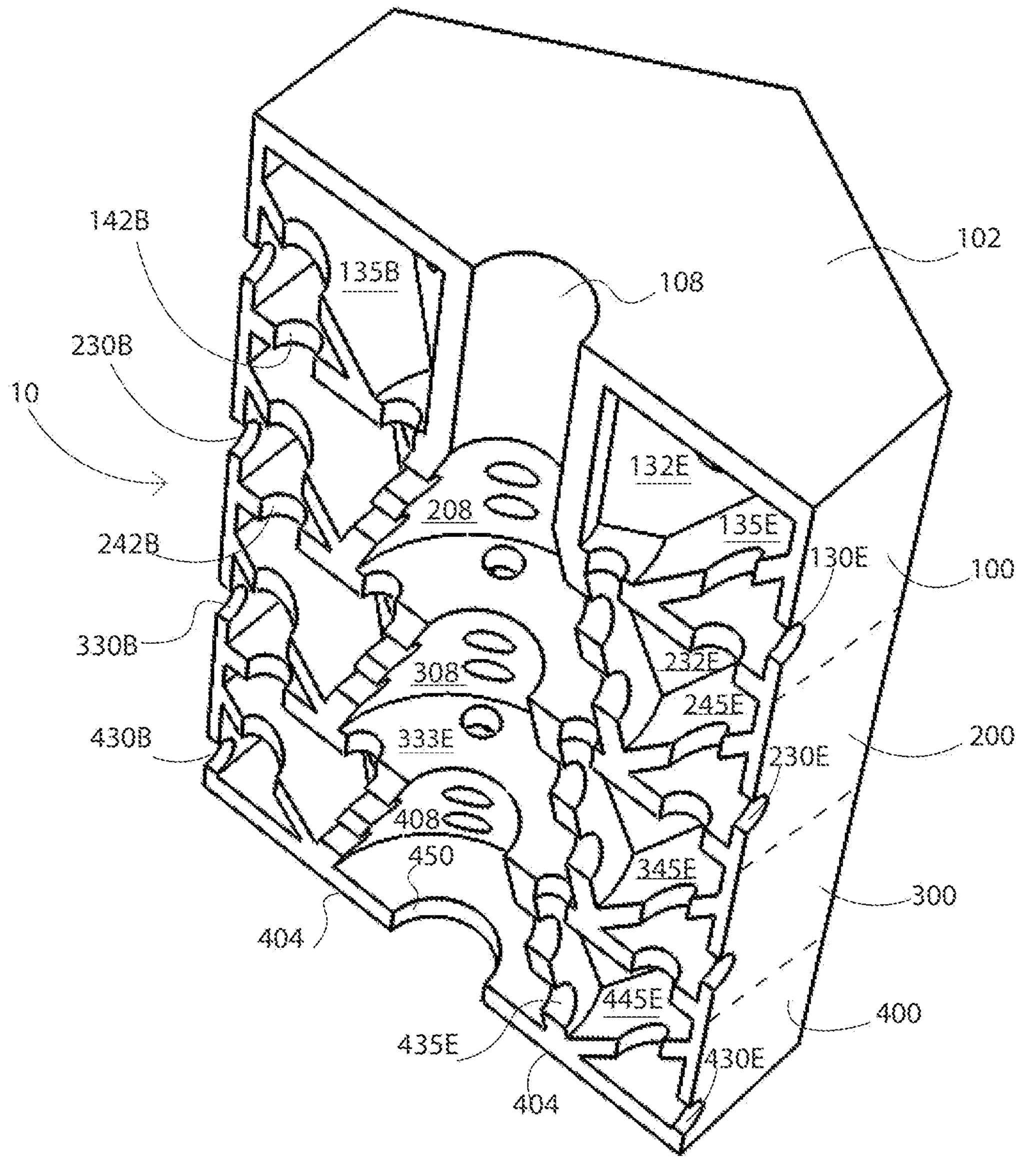
FIG. 10 is a perspective, cross-sectional view of cell 10 in accordance with the present invention.

In FIG. 10, the perspective view of the cross-section of FIG. 9 demonstrates that cell 10 is formed from initial stage 100 which is stacked upon first main stage 200 which is stacked upon intermediate main stage 300 which is stacked upon final stage 400. From FIG. 10, it is can be fully appreciated that nozzle 208 fits within nozzle 108 and nozzle 308 fits within nozzle 208 and nozzle 408 fits within nozzle 308 for secure assembly of the modular configuration of cell 10.

In FIG. 11, the top perspective view of cell 10 visualizes three sidewalls of the respective stages 100, 200, 300, and 400. Holes 130A, 130E, 130F, 230A, 230E, 230F, 330A, 330E, 430A, and 430F are positioned to connect respective outer chambers with adjacent stages of adjacent cells.

Figure 12:
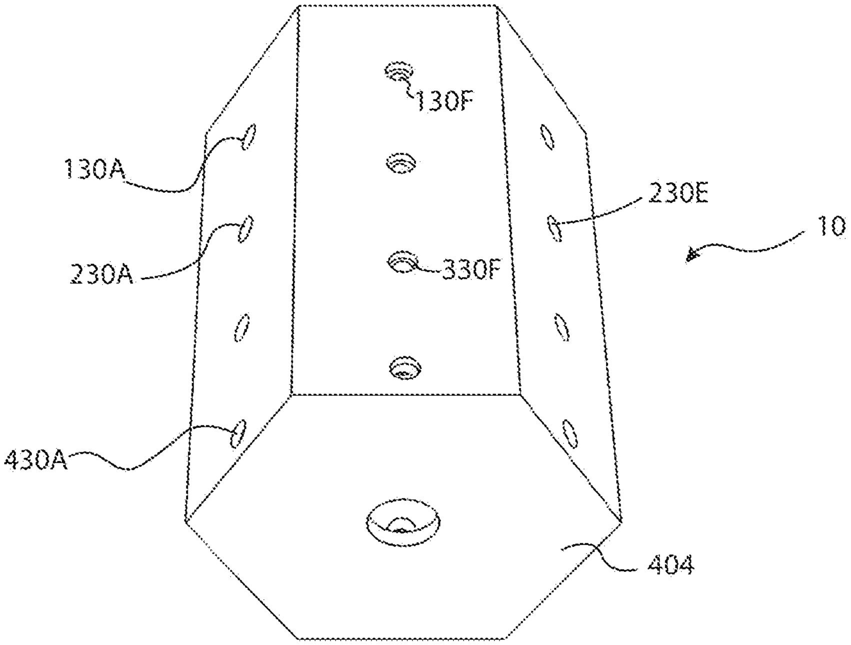
FIG. 12 is a bottom, perspective view of cell 10.

In FIG. 12, the bottom perspective view of cell 10 demonstrates shows bottom surface 404 of the final stage 400. Sidewall holes 130A, 130E, 130F, 230A, 230E, 230F, 330A, 330E, 330F, 430A, 430E, and 430F acoustically connect the respective outer chambers of cell 10 with adjacent stages of adjacent cells.

Figure 13:
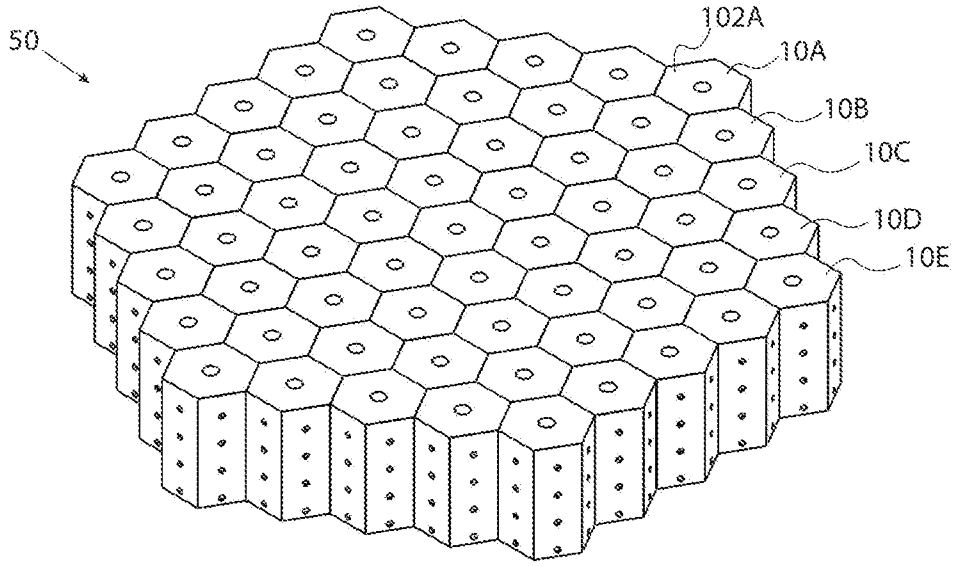
FIG. 13 is a top, perspective view of an amalgamation of cells 50 in accordance with the present invention.

In FIG. 13, the top perspective view shows an amalgamation of cells 50 in which cells 10A, 10B, 10C, 10D, 10E connect to other cells of the amalgamation of cells.

Figure 14:
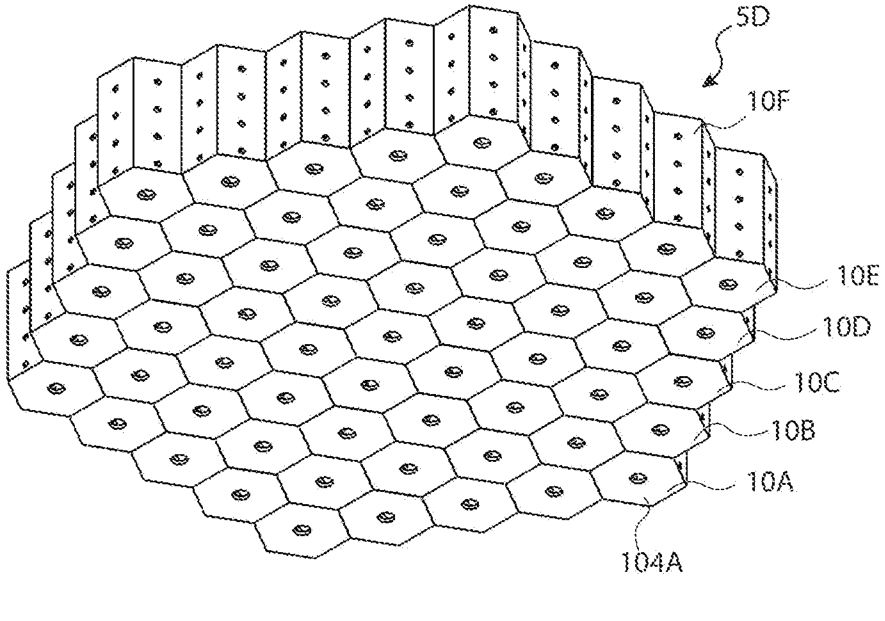
FIG. 14 is a bottom, perspective view of the amalgamation of cells 50 of FIG. 13.

In FIG. 14, the bottom perspective view shows amalgamation of cells 50 in which cells 10A, 10B, 10C, 10D, 10E connect to other cells of the amalgamation of cells.

Figure 15:
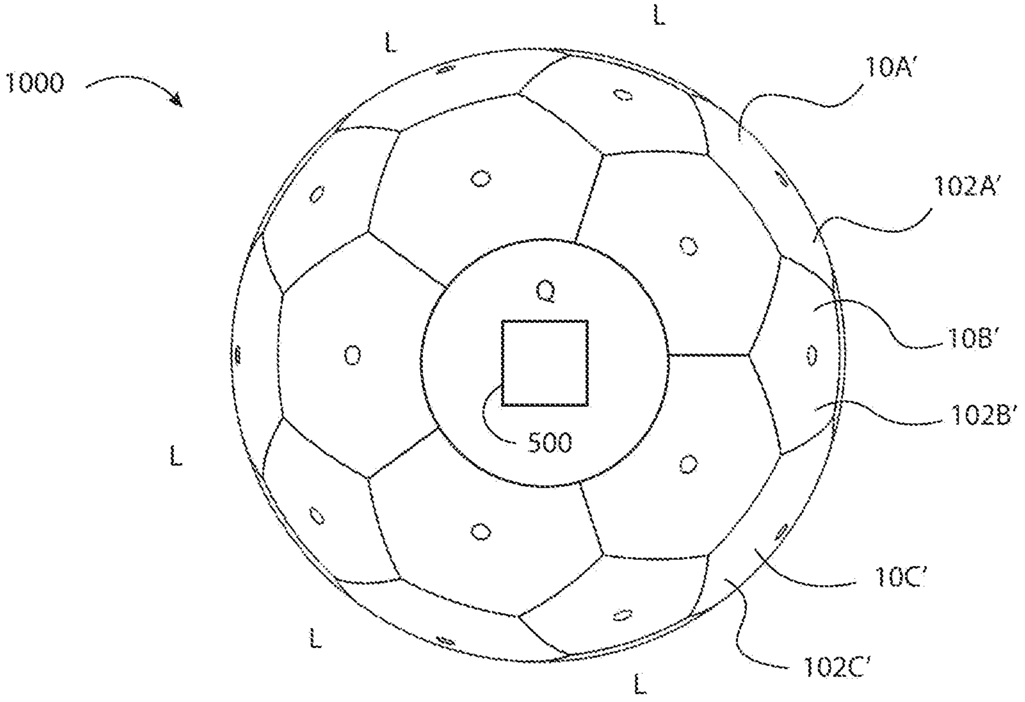
FIG. 15 is a perspective view of a sphere 1000 in accordance with the present invention consisting of cells, with the FIG. 15 including an x-ray view of an inner chamber Q in which components 500 are located.
Figure 16:
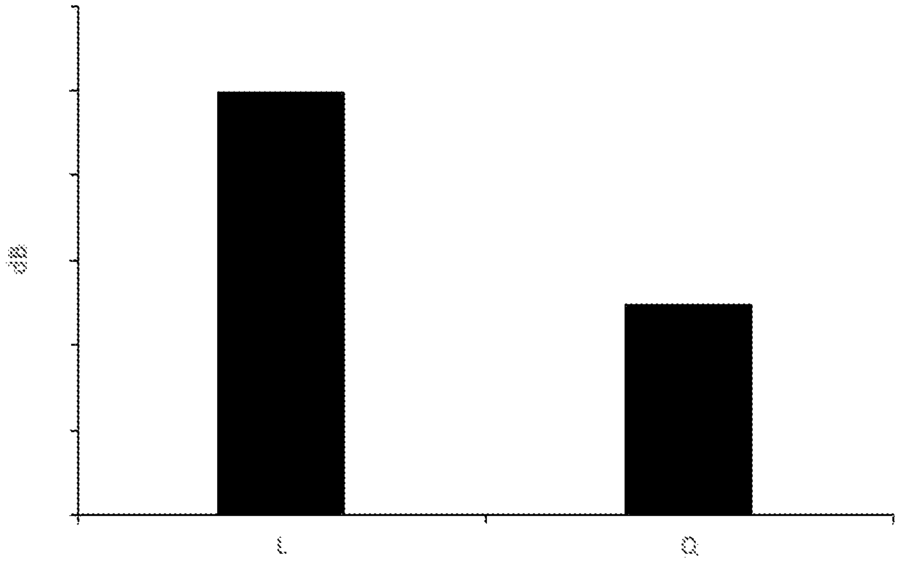
FIG. 16 is a graphical illustration depicting the sound level L that surrounds sphere 1000 and the sound level in inner chamber Q.

In FIG. 15, a sphere 1000 is located within an atmosphere that is surrounded by sound waves L. The sphere is constructed from cells 10A', 10B', 10C' which connect to other cells to construct the sphere 1000. The cells form an interior chamber Q in which is located components 500. As a result of the cells of the sphere surrounding the chamber Q, the components 500 experience a much reduced sound level than sound level L that is present outside of the sphere.

In FIG. 1, nozzle 108 is shown to be cylindrical in shape and in FIGS. 5 and 9, nozzles 208, 308, 408 are demonstrated to be conical in shape. However, it is understood that the nozzles can take other shapes so long as axial flow of sound waves from one stage to the next stage are accommodated by the nozzle. The nozzle 108 of the optional initial stage does not have holes or passages in the defining wall 118 so that sound waves entering the nozzle 108 are directed to the first stage nozzle 208. Nozzle 208 of the first main stage 200 has nozzles (e.g. nozzle passages 233A, 233D, 235A, 235D) that are located radially outward from an axial axis of the nozzle 208. However, in that the invention does not require the respective nozzles to be cylindrical or conical in shape (with such nozzle shapes having radially-oriented passages), the nozzle passages or holes can be understood as being on the lateral side or sides of the nozzle.

The stages, such as stages 100, 200, 300, 400 can be of virtually any geometric shape so long as the respective modules which constitute the respective stages can be fit together. Also, the nozzles do not necessarily have to be in the geometric center of the respective stages, but can be offset from the geometric center. The number of stages needed for a given cell can be determined by the given circumstances. In one situation a single stage might be sufficient, while situations may call for two, three, four or more stages to adequately filter and reduce the exiting sound waves to a desired level.

The governing equations of the invention can be derived using the fundamental acoustic equations which are as follows. The Conservation of Mass/Continuity equation, Conservation of Momentum Equation and the Isentropic Relationship of an Ideal Gas can be used to derive the wave equation for the final design.

The Conservation of Mass/Continuity Equation is defined as:

$$\frac{\partial}{\partial t}(\rho V) = \dot{m}_{in} - \dot{m}_{out} \tag{1}$$

where ρ is density, V is volume, ṁ is the mass flow rate.

The Conservation of Momentum Equation is defined as:

$$\frac{\partial}{\partial t}(\rho u) = \nabla\cdot(\rho u u) = -\nabla P \tag{2}$$

where ρ is density, u is velocity, P is the pressure.

The Isentropic Relationship of an Ideal Gas is:

$$dP = c^2 d\rho \tag{3}$$

where P is the pressure, c is the speed of sound, and ρ is density.

The general form of the wave equation is:

$$\frac{\partial^2 P}{\partial t^2} - C^2\frac{\partial^2 P}{\partial x^2} = 0 \tag{4}$$

where P is the pressure, c is the speed of sound, t is the time, and x is the one dimensional position vector.

The prototype of the present invention was constructed by using a three-dimensional printer with a stage length of 0.25 inches. However, other methods of construction can be used such as traditional machine shop equipment or advanced manufacturing methods Experimentation has demonstrated that the present invention reduces acoustic noise in both directions, i.e., whether the noise originates from the top or bottom of a cell. In addition, in that the different cells can be formed into various geometric shapes, the invention can provide acoustical protection in all directions.

Still further, since the nozzles of the present invention are not closed off to atmosphere, stored heat can escape a sound-protected space or chamber giving further protection to items, components or personnel.

The stages of the present invention may have no chambers, one chamber, or multiple chambers within a given stage. The number of chambers for the cell structures will be dependent upon the degree of sound-level filtering needed for a given situation. So too, the number of stages for the cell structures will be dependent upon the degree of sound-level filtering needed for a given situation. Some situations may not require an intermediate main stage, while other situations might require one intermediate main stage, or multiple iterations of the intermediate main stage. The outer geometry for the stages and subsequent cells will be dependent upon the given situation.

Various modifications and embodiments of the invention may be made by those skilled in the art without departing from the scope and spirit of the foregoing disclosure. Accordingly, the scope of the invention is limited only by the following claims.

What is claimed is:

1. An acoustic-metamaterial structure for diminishing acoustic noise, comprising:

a plurality of cells with each cell of said plurality of cells having a first stage and a second stage stacked upon one another;

said first stage of said each cell having a first-stage top surface, a first-stage bottom surface and at least three first-stage planar sidewalls that connect to the first-stage top and bottom surfaces of said each cell;

the first stage of said each cell has a first-stage nozzle that extends from the first-stage top surface through the first-stage bottom surface;

a plurality of first-stage chambers defined by first-stage chamber-forming walls connecting to the first stage top surface and first stage bottom surface are located in said each cell, said plurality of first-stage chambers being positioned radially outward from said first-stage nozzle, with apertures in a first-stage-nozzle sidewall being located in a middle region between the first-stage top surface and first-stage bottom surface acoustically connecting the first-stage nozzle to the plurality of first-stage chambers;

said second stage of said each cell has a second-stage top surface, a second-stage bottom surface, and at least three second-stage planar sidewalls that connect to the second stage top and bottom surfaces;

the second stage of said each cell has a second-stage nozzle that extends from the second-stage top surface through the second-stage bottom surface;

a plurality of second-stage chambers defined by second-stage chamber-forming walls connected to the second-stage top surface and second-stage bottom surface are located in the second stage of said each cell, said plurality of second-stage chambers being positioned radially outward from said second-stage nozzle, with apertures in a second-stage nozzle sidewall being located in a middle region between the second-stage top surface second stage bottom surface and acoustically connecting the second-stage nozzle to the plurality of second-stage chambers;

each of said plurality of chambers of said first stage is provided with an outer chamber passage that extends through the first-stage bottom surface;

each of said plurality of chambers of said second stage is provided with an outer chamber passage that extends through the second-stage top surface, with each outer chamber passage of said second-stage top surface directly connecting and aligning with a corresponding outer chamber passage in the bottom surface of said first stage;

each of the at least three first-stage planar sidewalls of said each cell makes a flush connection with an adjacent first-stage planar sidewall of a corresponding adjacent cell, with each of the at least three first-stage planar sidewalls of said each cell having an aperture directly connecting and aligned with an aperture of the adjacent first-stage planar sidewall of the corresponding adjacent cell; and each of the at least three second-stage planar sidewalls of said each cell makes a flush connection with a respective adjacent second-stage planar sidewall of a corresponding adjacent cell, with each of the at least three second-stage planar sidewalls of said each cell having an aperture directly connecting with and aligned with an aperture of the respective adjacent second-stage planar sidewall of the corresponding adjacent cell.

2. The acoustic-metamaterial structure for diminishing acoustic noise according to claim 1, wherein:

said plurality of cells form an amalgamation of cells.

3. The acoustic-metamaterial structure for diminishing acoustic noise according to claim 1, wherein:

said first-stage nozzle of said each cell is cylindrical in shape.

4. The acoustic-metamaterial structure for diminishing acoustic noise according to claim 1, wherein:

said second-stage nozzle of each cell is conical in shape.

5. The acoustic-metamaterial structure for diminishing acoustic noise according to claim 2, wherein:

said amalgamation of cells form and surround an inner chamber.

6. The acoustic-metamaterial structure for diminishing acoustic noise according to claim 1, wherein:

said first stage of said each cell is stacked upon the second stage of said each cell such that the bottom surface of said first stage of said each cell is flush with and connects to the top surface of said second stage of said each cell.

7. The acoustic-metamaterial structure for diminishing acoustic noise according to claim 1, wherein:

each of the first-stage chamber-forming walls connect to a respective first-stage sidewall that connects to a first-stage separating wall that separates respective first-stage inner chambers from respective first-stage outer chambers.

8. The acoustic-metamaterial structure for diminishing acoustic noise according to claim 7, wherein:

a passage in the first-stage separating wall acoustically connects the respective first stage outer chambers with the respective first-stage inner chambers.

9. The acoustic-metamaterial structure for diminishing acoustic noise according to claim 1, wherein:

each of the second-stage chamber-forming walls connects to a respective first-stage sidewall that connects to a second-stage separating wall that separates respective second-stage inner chambers from respective second-stage outer chambers.

10. The acoustic-metamaterial structure for diminishing acoustic noise according to claim 9, wherein:

a passage in the second-stage separating wall of each cell acoustically connects the respective second-stage outer chambers with the respective second- stage inner chambers.

11. The acoustic-metamaterial structure for diminishing acoustic noise according to claim 8, wherein:

a passage in the first-stage separating wall acoustically connects the respective first-stage outer chambers with the respective first-stage inner chambers.

12. The acoustic-metamaterial structure for diminishing acoustic noise according to claim 1, wherein:

each said cell has six first-stage sidewalls and six second-stage sidewalls forming a hexagonal structure connecting to identically shaped adjacent cells to form an amalgamation.

13. The acoustic-metamaterial structure for diminishing acoustic noise according to claim 1, wherein:

each cell of said plurality of cells has an initial stage having an initial stage nozzle that connects to the first-stage nozzle of the first stage.

14. The acoustic-metamaterial structure for diminishing acoustic noise according to claim 1, wherein:

said each cell has respective inner passages connecting the respective inner chambers of the first stage with the respective inner chambers of the second stage.

* * * * *